April 16, 1963
H. CORREC
3,085,960
GIRDLES FOR VERTICALLY STACKED SOLID MODERATOR
BARS IN A NUCLEAR REACTOR
Filed May 25, 1959
2 Sheets-Sheet 1
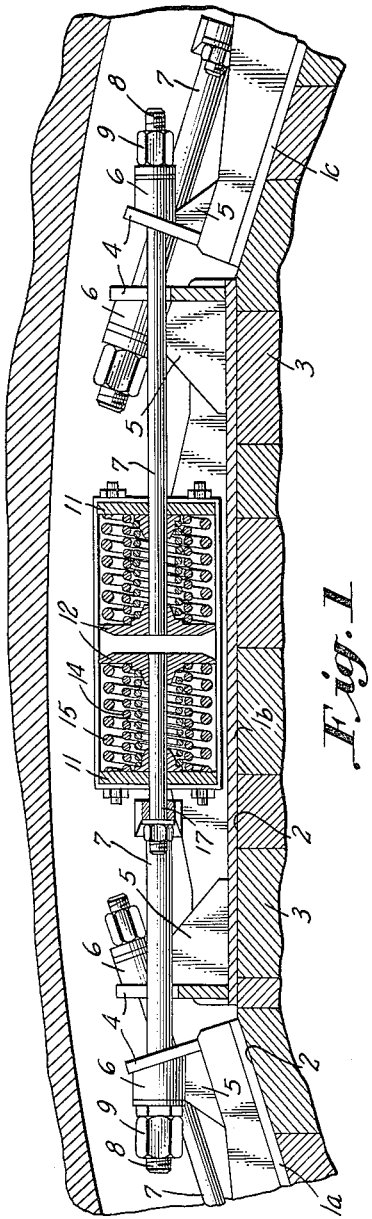
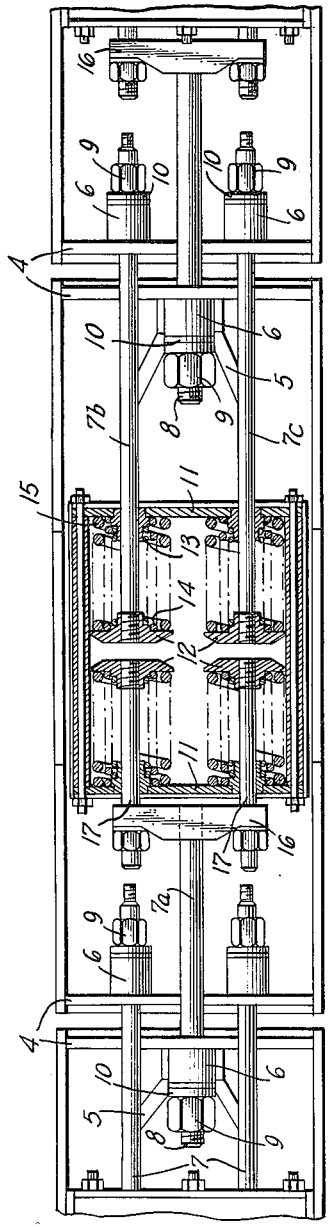
INVENTOR
*Henri Correc*
BY
*Cameron, Kerkam & Sutton*
ATTORNEYS April 16, 1963 H. CORREC 3,085,960
GIRDLES FOR VERTICALLY STACKED SOLID MODERATOR
BARS IN A NUCLEAR REACTOR
Filed May 25, 1959 2 Sheets-Sheet 2

INVENTOR
Henri Correc

BY Cameron, Kerkam & Sutton
ATTORNEYS

United States Patent Office 3,085,960
Patented Apr. 16, 1963

3,085,960
GIRDLES FOR VERTICALLY STACKED SOLID MODERATOR BARS IN A NUCLEAR REACTOR
Henri Correc, Paris, France, assignor to Commissariat a l'Energie Atomique, Paris, France
Filed May 25, 1959, Ser. No. 815,507
Claims priority, application France June 5, 1958
5 Claims. (Cl. 204—193.2)

The present invention relates to girdles and more particularly girdles for vertically stacked solid moderator bars in a nuclear reactor, and especially graphite bars.

One of the objects of the invention is to provide girdles which efficaciously hold the vertical stack together, it being possible to place the said girdles at various levels on the stack.

Another object of the invention is to retain a certain degree of effectiveness in the girdle action itself, even if one of the elements of a girdle should accidentally be broken.

Still another object of the invention is to use springs under such conditions that their action is advantageously transmitted in the radial direction with respect to the stack.

According to the present invention there is provided a girdle comprising a plurality of links, each link at each end being coupled to the next link but one in the girdle, that face of each link which will bear up on the article surrounded by the girdle being movable outwardly against the action of resilient means.

According to the present invention there is further provided a nuclear reactor comprising a stack of bars of solid moderator material and a girdle extending about the stack, the girdle comprising a plurality of links each link being coupled at each end to the next link but one in the girdle, the face of each link bearing on the stack being movable outwardly by the stack against spring pressure.

In order that the present invention may be understood there will now be described certain embodiments thereof given by way of example only, reference being made to the accompanying drawings in which FIGURE 1 is a part-sectioned horizontal view of part of a girdle according to the invention.

FIGURE 2 is a part-sectioned elevation of the part of a girdle illustrated in FIGURE 1.

Only the elements required for an understanding of the invention are illustrated in these figures, corresponding elements in these figures bearing identical reference numbers.

Figure 3:
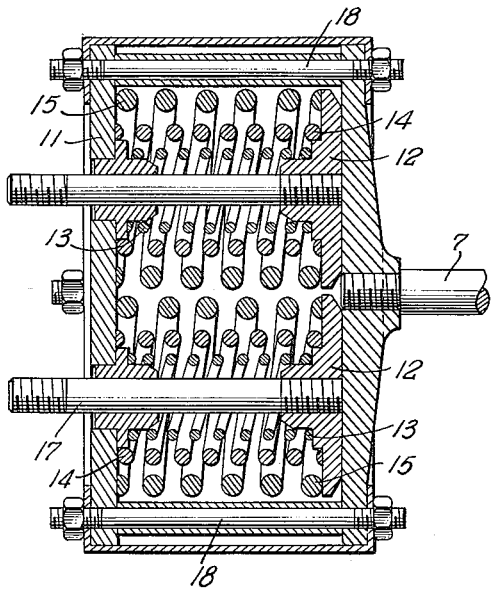
FIGURE 3 illustrates a variant of embodiment of the springs joining two non-consecutive plates.

As may be seen in FIGURE 1, a girdle comprises a series of links comprising plates 1a, 1b, 1c, which bear against the faces 2 of a stack of graphite rods 3.

Connections join two non-contiguous plates such as 1a and 1c. For example, in FIGURE 1, the plates 1a and 1c situated on the left and on the right are joined to one another, but are not joined to the plate 1b illustrated in the middle of the figure.

In order to form the connections, the ends of each plate 1 comprise connection supports 4 welded to plates 5 which are disposed substantially in the direction of the length of the plates 1, and which prevent the supports 4 from being distorted by the tractive forces which they have to resist.

Sleeves 6 are attached obliquely with respect to the plane of the supports 4, and have pull-rods 7 passing through them. The sleeves 6 and the rods 7 may be of different diameters according to the positions which they occupy.

For example, as may be seen in FIGURE 2, when two rods 7b and 7c are used instead of only one for reasons of convenience, these two rods may be of smaller diameters than the single rod 7a. Above the plate 1b illustrated at the centre of the figure, the rod 7a on the left is thus of greater diameter than the two rods 7b and 7c on the right.

The rods 7 are threaded at the end 8, and each receives a nut 9 which bears against the corresponding sleeve 6 by way of washers 10.

The rods joining two non-contiguous plates are connected by an elastic traction device. It will be seen in FIGURES 1 and 2 that this elastic device comprises bearing plates or stops 11 and collars 12. Coaxially disposed springs 13, 14 and 15, of differing diameters, are disposed between the plates 11 and the collars 12.

Where there is only one rod 7 (as on the left side of the elastic device illustrated in FIGURE 2), a stirrup 16 is attached to the single rod 7a, and carries two additional rods 17 which fulfil the same function as the rods 7b and 7c disposed on the right of the elastic device.

Each of the rods 17 and each of the smaller-diameter rods 7b and 7c carries a collar 12, and passes through the bearing plates 11, and it follows from this that the compression springs 13, 14 and 15 resist the tractive forces exerted on the rods 7, the said forces being due to expansion of the vertical stack, or to the tendency of the rods which form the said stack to move away from one another.

The girdle which has just been described may be very easily placed in position, and consists of elements which are easily machined.

This girdle consists in practice of two separate girdles with alternated elements. Thus if one of the connections 7 is accidentally broken the stack nevertheless remains completely girdled. Consequently the girdle is reliable.

In addition, the springs 13, 14 and 15 act efficaciously in the radial direction with respect to the stack, even if their axes are parallel with the faces of the stack (as in FIGURES 1 and 2). The tractive forces due to the springs act along the rods 7 corresponding to two non-contiguous plates 1a and 1c.

The angle between the rods 7 for two non-contiguous plates is smaller than that between rods 7 for two consecutive plates, and the forces exerted by the springs along the rods 7 combine in more advantageous fashion producing greater radial forces.

FIGURE 3 illustrates a variant of embodiment of the elastic device described with reference to FIGURES 1 and 2. According to this variant, there is only a single series of springs 13, 14 and 15. There are therefore only two collars 12 in each elastic device. The springs bear against the collars 12 and against the bearing plate 11. Rods 17 are attached, as before, to the collars 12, and rod 7 is secured to bearing plate 11 by strut-bolts 18.

Figure 4:
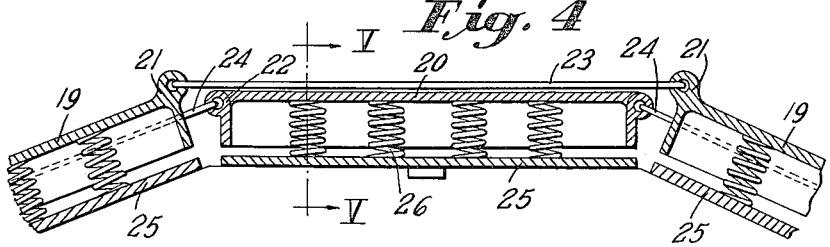
FIGURE 4 is a diagrammatic horizontal section of a variant of embodiment of the girdles to which the invention relates.

FIGURE 4 diagrammatically illustrates another embodiment of the girdle of the present invention. According to this variant, the girdle consists of boxes 19 and 20 equipped with lugs to which the connectors are attached.

The boxes 19 have lugs 21 which are longer than the lugs 22 on the boxes 20. The connectors 23, which are rigid, join the boxes 19 and pass around the boxes 20, while the connectors 24, which join the boxes 20, pass beside the boxes 19. There are therefore two independent girdling devices in each girdle.

Each box bears against the corresponding face of the graphite stack by way of a plate 25 resiliently urged toward the stack by springs 26 which act radially with respect to the stack.

Figure 5:
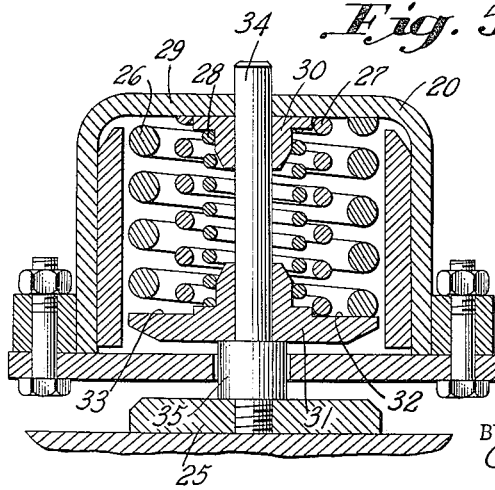
FIGURE 5 is a section along V in FIGURE 4, showing details of the springs and bearing surfaces according to the invention.

The springs 26, which are diagrammatically illustrated in FIGURE 4, may comprise groups of co-axial springs 26, 27 and 28, as may be seen in FIGURE 5. These springs work in compression; they bear against the base 29 and against a shoulder 30 which abuts against the inside of a box 19 or 20, and they also bear against a collar 31 which has shoulders 32 and 33. A rod 34 slides through the base 29 and the shoulder 30, and carries a head 35 which bears against the collar 31. The head 35 pushes the corresponding bearing plate 25 back towards the stack.

What is claimed is:

1. In a nuclear reactor comprising a vertical stack of solid moderator bars of substantially polygonal cross-section, a horizontal girdle for holding the stack together in spite of thermal expansion and the Wigner effect, said girdle comprising a series of links distributed around the peripheral surface of the pile, each of said links comprising an elongated bottom member engaging a side of said polygonal pile and exerting a force of compression normal thereto, spring means located in the central part of each link, and means including said spring means for resiliently connecting the neighboring ends of each two links between which a link carrying one of said spring means is located.

2. A girdle as defined in claim 1, said connecting means comprising rods connected to and extending from each end of each link, the rods from said neighboring ends terminating in collars adjacent each other near the center of the intermediate link, compression spring means engaging said collars and compressible for separating movement of said rods and collars away from each other.

3. A girdle as defined in claim 2, said compression spring means comprising spring stops movable longitudinally along each rod, compression spring means interposed between each stop and its associated collar, and means connecting and limiting the amount of separation of said stops.

4. A girdle as defined in claim 2, said compression spring means comprising a spring stop movable longitudinally along one of said rods, compression spring means interposed between said spring stop and its associated collar, and means connecting and limiting the extent of separation of said spring stop and the collar on the other of said rods.

5. In a girdle and restraint means comprising an elastic band around a nuclear reactor solid moderator structure, a first plurality of spaced boxes in said band, first connectors for non-extensibly coupling neighboring ends of said boxes, a second plurality of spaced boxes in said band, second connectors for non-extensibly coupling neighboring ends of said second plurality of boxes, a box of said second plurality of boxes being disposed between adjacent boxes of said first plurality of boxes, said first connectors passing over said second boxes and said second connectors passing beside said first boxes, a plate for each box, said plates bearing on said structure, and radially compressible resilient means between each plate and its corresponding box.

References Cited in the file of this patent

UNITED STATES PATENTS

| | | |
|---|---|---|
| 2,853,440 | Hughes | Sept. 23, 1958 |
| 2,865,828 | Long et al. | Dec. 23, 1958 |